(12) United States Patent
Blumberg et al.

(10) Patent No.: US 8,983,242 B2
(45) Date of Patent: Mar. 17, 2015

(54) PLASMONIC DEVICE FOR MODULATION AND AMPLIFICATION OF PLASMONIC SIGNALS

(75) Inventors: Girsh Blumberg, New Providence, NJ (US); Benard Yurke, Boise, ID (US)

(73) Assignee: Alcatel Lucent, Boulogne-Billancourt (FR)

( * ) Notice: Subject to any disclaimer, the term of this patent is extended or adjusted under 35 U.S.C. 154(b) by 2002 days.

(21) Appl. No.: 12/023,489

(22) Filed: Jan. 31, 2008

(65) Prior Publication Data
US 2009/0195782 A1  Aug. 6, 2009

(51) Int. Cl.
  G02F 1/295  (2006.01)
  G02F 1/035  (2006.01)
  G02B 6/12   (2006.01)
  G02B 6/122  (2006.01)
  B82Y 20/00  (2011.01)

(52) U.S. Cl.
  CPC .............. *G02B 6/1226* (2013.01); *B82Y 20/00* (2013.01)
  USPC ...................... 385/5; 382/3; 382/14

(58) Field of Classification Search
  USPC ........................ 385/5, 4, 14–16, 31
  See application file for complete search history.

(56) References Cited

U.S. PATENT DOCUMENTS

| | | | |
|---|---|---|---|
| 4,360,246 A | 11/1982 | Figueroa et al. | |
| 5,536,954 A | 7/1996 | Rosen et al. | |
| 5,668,512 A | 9/1997 | Mohwinkel et al. | |
| 5,821,815 A | 10/1998 | Mohwinkel | |
| 6,075,640 A * | 6/2000 | Nelson | 359/239 |
| 6,801,691 B2 * | 10/2004 | Berini | 385/39 |
| 7,027,689 B2 | 4/2006 | Blumberg et al. | |
| 7,039,277 B2 | 5/2006 | Blumberg et al. | |
| 7,039,315 B2 | 5/2006 | Blumberg et al. | |
| 7,126,151 B2 | 10/2006 | Estes et al. | |
| 7,421,002 B2 | 9/2008 | Furuyama | |
| 7,447,396 B2 * | 11/2008 | Hyde et al. | 385/16 |
| 7,671,996 B2 | 3/2010 | Niwa et al. | |

(Continued)

FOREIGN PATENT DOCUMENTS

JP  S53-004446 A  1/1978

OTHER PUBLICATIONS

"All-optical switching at multi-100-gb/s data rates with Mach-Zehnder interferometer switches," by Schreieck et al, IEEE journal of Quantum Electronics, vol. 38, No. 8, pp. 1053-1061, Aug. 2002.*

(Continued)

*Primary Examiner* — Robert Tavlykaev
(74) *Attorney, Agent, or Firm* — Mendelsohn, Drucker & Dunleavy, P.C.; Yuri Gruzdkov

(57) ABSTRACT

According to one embodiment of the invention, a plasmonic device has a beam splitter adapted to split a surface-plasmon (SP) input beam into first and second SP beams and direct them along first and second propagation paths, respectively. One of the propagation paths has a plasmonic-beam interaction region adapted to controllably change the phase of the corresponding split beam within that interaction region in response to an SP control signal applied thereto. The plasmonic device further has an SP beam mixer adapted to receive the first and second beams from their respective propagation paths and to mix them to produce an SP output signal. In various configurations, the plasmonic device can operate as a plasmonic-signal amplifier, a plasmonic-beam router, a 1×2 plasmonic-beam switch, and/or a plasmonic modulator.

8 Claims, 3 Drawing Sheets

(56) References Cited

U.S. PATENT DOCUMENTS

| | | | |
|---|---|---|---|
| 7,706,653 | B2* | 4/2010 | Park et al. .................. 385/131 |
| 2003/0059147 | A1* | 3/2003 | Berini .......................... 385/2 |
| 2007/0103755 | A1 | 5/2007 | Furuyama |
| 2007/0286546 | A1 | 12/2007 | Masson et al. |
| 2008/0212975 | A1 | 9/2008 | Burenkov |
| 2009/0052827 | A1 | 2/2009 | Durfee et al. |
| 2009/0065801 | A1 | 3/2009 | Conway et al. |
| 2009/0066962 | A1 | 3/2009 | Niwa et al. |
| 2009/0195783 | A1 | 8/2009 | Tazuke et al. |
| 2010/0202728 | A1 | 8/2010 | Blumberg et al. |
| 2011/0128614 | A1 | 6/2011 | Blumberg et al. |

OTHER PUBLICATIONS

"P-polarized nonlinear surface polaritons in materials with intensity-dependent dielectric functions," by Leung, Physical Review B, vol. 32, No. 8, pp. 5093-5101, 1985.*

"Design, near-field characterization, and modeling of 45o surface-plasmon Bragg mirrors," by Gonzalez et al, Physical Review B, vol. 73, pp. 1555416-1 through 1555416-13, 2006.*

"Pump-probe optical switching in prism-coupled Au:SiO2 nanocomposite waveguide film", by Lee et al, Applied Physics Letters, vol. 91, pp. 141905-1 through 141905-3, 2007.*

"Ultra-compact directional couplers and Mach-Zehnder interferometers employing surface plasmon polaritons," by Han et al, Optics Communications, vol. 259, pp. 690-695, 2006.*

W. L. Barnes, et al., entitled "Surface Plasmon Subwavelength Optics," published in Nature, Aug. 14, 2003, v. 424, pp. 824-830.

D. Egorov, et al., entitled "Two-Dimensional Control of Surface Plasmons and Directional Beaming from Arrays of Subwavelength Apertures," published in Physical Review B 70, 033404 (2004), (4 pages).

O. Roslyak, et al., entitled "Theory of Enhanced Second-Harmonic Generation by the Quadrupole-Dipole Hybrid Exciton," arXiv:0704.1923v2 [cond-mat.mtrl-sci] May 5, 2007, (9 pages).

E Ozbay, entitled "Plasmonics: Merging Photonics and Electronics at Nanoscale Dimensions," www.sciencemag.org, Science vol. 311, Jan. 13, 2006, pp. 189-193.

Agnolini, Sibastien et al., "Implementation of BBS4 protocol by QPSK modulation using dual-electrode Mach-Zehnder modulator," IEEE International Conference on Industrial Technology (KIT), 2004, pp. 250-253.

* cited by examiner

100

100

100

200

300

PLASMONIC DEVICE FOR MODULATION AND AMPLIFICATION OF PLASMONIC SIGNALS

BACKGROUND OF THE INVENTION

1. Field of the Invention

The present invention relates to communication equipment and, more specifically, to plasmonic circuits.

2. Description of the Related Art

This section introduces aspects that may help facilitate a better understanding of the invention(s). Accordingly, the statements of this section are to be read in this light and are not to be understood as admissions about what is in the prior art and/or what is not in the prior art.

Surface plasmons (SPs), also often referred to as surface-plasmon polaritons, are surface-bound waves that can propagate, e.g., along a metal-dielectric interface or along a metal-vacuum interface. SPs can be qualitatively viewed as a combination of electromagnetic waves and associated charge waves. The electromagnetic waves propagate along the interface due to their interaction with free surface charges of the metal. The interaction also causes the surface charges to oscillate in resonance with the electromagnetic wave. The combined physical entity created via this resonant interaction, i.e., an entity including a charge wave and an electromagnetic wave, is an SP. A detailed description of certain physical properties of SPs can be found, e.g., in an article by W. L. Barnes, et al., entitled "Surface Plasmon Subwavelength Optics," published in Nature, 14 Aug. 2003, v. 424, pp. 824-830, the teachings of which are incorporated herein by reference in its entirety.

One problem with SPs is that their propagation is typically characterized by a relatively high rate of attenuation and/or dissipation. More specifically, a beam of SPs propagating along a metal-dielectric interface is attenuated, primarily due to resistive losses in the metal. The rate of attenuation depends on the wavelength and the complex dielectric function of the metal. For example, in the visible spectrum, SP propagation distances along a silver-dielectric interface are in the range between about 10 μm and about 100 μm. Jette-Charbonneau et al. (see Optics Express, 2005, v. 13, p. 4674) describe structures/materials, in which SP propagation distances are in the sub-millimeter range.

SUMMARY OF THE INVENTION

According to one embodiment of the invention, a plasmonic device has a beam splitter adapted to split a surface-plasmon input beam into first and second split beams and direct them along first and second propagation paths, respectively. One of the propagation paths has a plasmonic-beam interaction region adapted to controllably change the phase accrued by the corresponding split beam within that interaction region in response to a surface-plasmon control signal applied thereto. The plasmonic device further has a plasmonic-beam mixer adapted to receive the first and second beams from their respective propagation paths and to mix them to produce a surface-plasmon output signal. In one configuration, the plasmonic device operates as a plasmonic-signal amplifier, with the plasmonic output signal providing an amplified version of the plasmonic control signal. Advantageously, the plasmonic-signal amplifier can be used to boost propagation distances for plasmonic signals. In another configuration, the plasmonic device operates as a surface-plasmon beam router or a 1×2 surface-plasmon beam switch. In yet another configuration, the plasmonic device operates as a plasmonic modulator, in which one surface-plasmon signal is used to modulate the intensity of another surface-plasmon signal.

According to one embodiment, a plasmonic device has a first surface plasmon (SP) beam splitter adapted to split an SP input beam into first and second SP beams, to direct the first SP beam along a first propagation path, and to direct the second SP beam along a second propagation path. The plasmonic device also has a plasmonic-beam interaction region located in the second propagation path and adapted to change a phase of surface plasmons of the second SP beam in a manner responsive to a control signal of surface plasmons applied to said region. The plasmonic device further has an SP beam mixer located to receive the first and second SP beams from the first and second propagation paths and to mix said received beams to produce an SP output beam whose amplitude is responsive to said phase.

According to another embodiment, a method of processing plasmonic signals comprises the steps of: (A) splitting an SP input beam into first and second SP beams; (B) directing the first SP beam along a first propagation path; (C) directing the second SP beam along a second propagation path traversing a plasmonic-beam interaction region; (D) applying a control signal of surface plasmons to said interaction region to change a phase of surface plasmons of the second SP beam in said interaction region; and (E) mixing the SP beams from the first and second propagation paths in an SP beam mixer to produce an SP output beam whose amplitude is responsive to said phase.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1A:
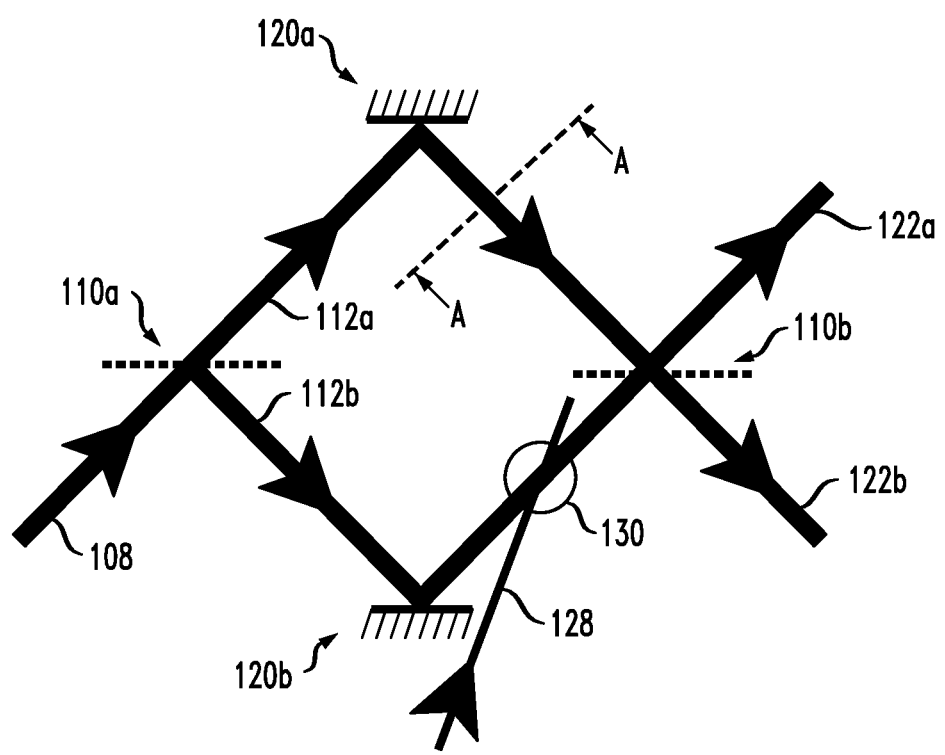
FIG. 1A shows a top view of a plasmonic device according to one embodiment of the invention.

FIG. 1A shows a top view of a plasmonic device 100 according to one embodiment of the invention. Device 100 has a surface-plasmon (SP) beam splitter 110a that receives a plasmonic input beam 108 Beam splitter 110a divides beam 108 into two (attenuated) plasmonic beams 112a-b and directs them to SP mirrors 120a-b, respectively. Each of SP mirrors 120a-b then redirects the corresponding received beam 112 to an SP beam splitter 110b. Between SP mirror 120b and SP beam splitter 110b, plasmonic beam 112b passes through a plasmonic-beam interaction region 130, in which the phase of plasmonic beam 112b can be controllably affected by a plasmonic control signal 128, which itself is also a plasmonic beam. The interaction between plasmonic beam 112b and control signal 128 in region 130 is described in more detail below. SP beam splitter 110b acts as a plasmonic-beam mixer that mixes received plasmonic beams 112a-b to generate two plasmonic output beams 122a-b.

The relative phase of plasmonic beams 112a-b at SP beam splitter 110b controls the intensity of plasmonic output beams 122a-b. For example, if each of SP beam splitters 110a-b is a 50/50 SP beam splitter and signal attenuation in the arms of device 100 is relatively small, then intensities $I_a$ and $I_b$ of plasmonic output beams 122a-b, respectively, can be expressed as follows:

$$I_a = \frac{I_0}{2}(1+\sin\phi) \quad (1a)$$

$$I_b = \frac{I_0}{2}(1-\sin\phi) \quad (1b)$$

where $I_0$ is the intensity of plasmonic input beam 108, and $\phi$ is the relative phase accrued by plasmonic beams 112a-b in the arms of device 100 between beam splitters 110a-b. If $\phi=+90°$, then plasmonic beam 122b is substantially quenched and plasmonic beam 122a receives substantially all of the output power. On the other hand, if $\phi=-90°$, then plasmonic beam 122a is substantially quenched and plasmonic beam 122b receives substantially all of the output power. Intermediate values of $\phi$ produce intermediate intensities for plasmonic output beams 122a-b.

Figure 1B:
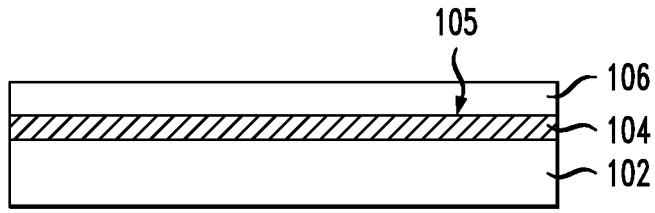
FIG. 1B shows a cross-sectional side view of the plasmonic device of FIG. 1A according to one embodiment of the invention.

FIG. 1B shows a cross-sectional side view of plasmonic device 100 according to one embodiment of the invention. More specifically, the view of FIG. 1B shows a cross-section along the plane labeled AA in FIG. 1A, which plane is orthogonal to the plane of that figure. Device 100 is formed on a substrate 102. A metal layer 104 is formed over substrate 102. A dielectric layer 106 is formed over metal layer 104. An interface 105 between metal layer 104 and dielectric layer 106 serves as a conduit for plasmonic beam 112a. In other regions of device 100, interface 105 similarly serves as a conduit for other plasmonic beams. In various embodiments, dielectric materials for layer 106 can be selected, e.g., from a group composed of photoresist materials, silicon, silicon nitride, and silicon oxide. In other embodiments, layer 106 can also be vacuum, air, or another suitable dielectric fluid.

In the embodiment of FIG. 1B, plasmonic beams 108, 112a-b, 122a-b, and 128 are preferably SP beams that remain substantially collimated over propagation distances corresponding to device 100 even in the absence of a special physical structure for laterally confining those beams as they propagate along interface 105. Methods and devices for generating such SP beams are disclosed, e.g., in (1) D. Egorov, et al., "Two-Dimensional Control of Surface Plasmons and Directional Beaming from Arrays of Subwavelength Apertures," Phys. Rev. B, 2004, v. 70, pub. 033404 and (2) U.S. Pat. Nos. 7,027,689, 7,039,277, and 7,039,315, all of which are incorporated herein by reference in their entirety. Representative beam splitters and mirrors that can be used in device 100 as beam splitters 110 and mirrors 120, respectively, are disclosed, e.g., in U.S. patent application Ser. No. 11/949,216, filed on Dec. 3, 2007, and documents incorporated therein. Both U.S. patent application Ser. No. 11/949,216 and all the documents incorporated therein are incorporated herein by reference in their entirety.

Figure 1C:
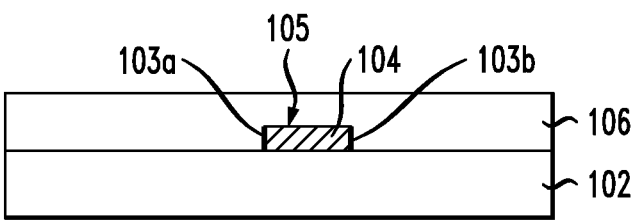
FIG. 1C shows a cross-sectional side view of the plasmonic device of FIG. 1A according to another embodiment of the invention.

FIG. 1C shows a cross-sectional side view of plasmonic device 100 according to another embodiment of the invention. Similar to the view of FIG. 1B, the view of FIG. 1C shows a cross-section along plane AA (see FIG. 1A). In the embodiment of FIG. 1C, device 100 similarly has substrate 102, metal layer 104, and dielectric layer 106. However, metal layer 104 is now patterned to create relatively narrow strips that provide lateral confinement and waveguiding for the corresponding plasmonic beams. For example, edges 103a-b of patterned metal layer 104 shown in FIG. 1C provide lateral confinement, thereby forming a substantially one-dimensional (1D) waveguide for plasmonic beam 112a. The edges of other strips in patterned metal layer 104 (not explicitly shown in FIG. 1C) similarly laterally confine and 1D waveguide other plasmonic beams shown in FIG. 1A. One skilled in the art will appreciate that a 1D plasmonic waveguide created by patterning metal layer 104 can have a curved shape that enables that plasmonic waveguide to change the propagation direction of the corresponding plasmonic beam. As a result, in the embodiment of device 100 corresponding to FIG. 1C, SP mirrors 120a-b are optional and might not be present in the device structure.

Referring again to FIG. 1A, in region 130, dielectric layer 106 comprises a nonlinear optical material having an optical index of refraction that is a strongly varying function of the electric field (E) applied thereto. Such nonlinear optical materials are known in the art and include, e.g., cuprous oxide, barium titanate, lithium niobate, cadmium zinc telluride, yttrium iron garnet, and zinc telluride. In various embodiments, other suitable polarizable materials having relatively large dielectric constants, e.g., crystalline dielectrics and semiconductors whose unit cells lack inversion or reflection symmetry, can also be used. A detailed description of relevant optical properties of one of these materials (i.e., cuprous oxide) can be found, e.g., in the online www.arXiv.org database in the e-preprint stored therein and dated May 5, 2007, by O. Roslyak and J. Birman, entitled "Theory of Enhanced Second-Harmonic Generation by the Quadrupole-Dipole Hybrid Exciton," which is incorporated herein by reference in its entirety.

The index of refraction (N(E)) of the nonlinear optical material in region 130 is generally described by Eq. (2):

$$N(E)=n_1+n_2|E|^2 \quad (2)$$

where $n_1$ and $n_2$ are constants. When plasmonic beam 112b and control signal 128 are appropriately phase-matched and spatially overlap within region 130, the electromagnetic field of plasmonic beam 128 affects the effective index of refraction, to which plasmonic beam 112b is subjected, as described by Eq. (2). Over distance l within region 130, the phase of plasmonic beam 112b changes by amount $\Delta\Phi_b$ expressed by Eq. (3):

$$\Delta\Phi_b = 4\pi N(E)\frac{l}{\lambda_0} \quad (3)$$

where $\lambda_0$ is the vacuum wavelength. Since, in the other arm of device 100, plasmonic beam 112a passes through a regular dielectric, that beam's phase changes over distance l by amount $\Delta\Phi_a$ expressed by Eq. (4):

$$\Delta\Phi_a = 4\pi n_d \frac{l}{\lambda_0} \quad (4)$$

where $n_d$ is the index of refraction of that dielectric. Using Eqs. (2)-(4), one finds an expression for φ:

$$\phi = \Delta\Phi_a - \Delta\Phi_b = 4\pi(n_d - n_1)\frac{l}{\lambda_0} - 4\pi n_2|E|^2 \frac{l}{\lambda_0} \quad (5)$$

Note that, for simplicity, Eq. (5) assumes that the arms of device 100 have equal lengths. One skilled in the art will appreciate that those arms can be implemented to have either equal or unequal lengths, e.g., can differ in length by non-integral or integral multiples of the SP wavelength, and that the description of various device configurations below is at least qualitatively applicable to embodiments of device 100 characterized by various relative arms lengths.

In one configuration of device 100, by appropriately selecting two alternate intensity values for plasmonic control signal 128, the value of φ can be controllably toggled between +90° and −90°, thereby changing the propagation direction of the resulting plasmonic output beam. In this configuration, device 100 operates as a plasmonic-beam router or a 1×2 plasmonic-beam switch.

In another configuration, device 100 can be used to generate a single plasmonic output beam. For example, plasmonic beam 122b can be blocked, and plasmonic beam 122a can be used as the single output beam. Then, by controllably changing the intensity of plasmonic control signal 128, plasmonic beam 122a can be intensity modulated. In this configuration, device 100 operates as a plasmonic modulator. Note that, in this modulator, a plasmonic control signal (signal 128) is used to modulate the intensity of another plasmonic signal (beam 122a).

In yet another configuration, by appropriately selecting the size of region 130 and/or the relative lengths of the arms of device 100, the relative phase shift between beams 112a-b analogous to that represented by the first term in Eq. (5) can be set, e.g., to (m+½)π, where m is an integer. Then, for a relatively weak electric field, the sine function, e.g., in Eq. (1b), can be expanded to arrive at Eq. (6):

$$I_b = 4I_0 \left(\pi n_2 \frac{l}{\lambda_0}\right)^2 |E|^4 \quad (6)$$

If plasmonic control signal 128 is intensity modulated, then, according to Eq. (6), plasmonic output beam 122b becomes similarly modulated. Provided that plasmonic input beam 108 has a relatively high intensity, the modulation amplitude of plasmonic beam 122b will be greater than the modulation amplitude of plasmonic signal 128. Thus, in this configuration, device 100 operates as a plasmonic-signal amplifier that amplifies signal 128. One skilled in the art will appreciate that plasmonic output beam 122a can similarly be used as an amplified signal.

Figure 2:
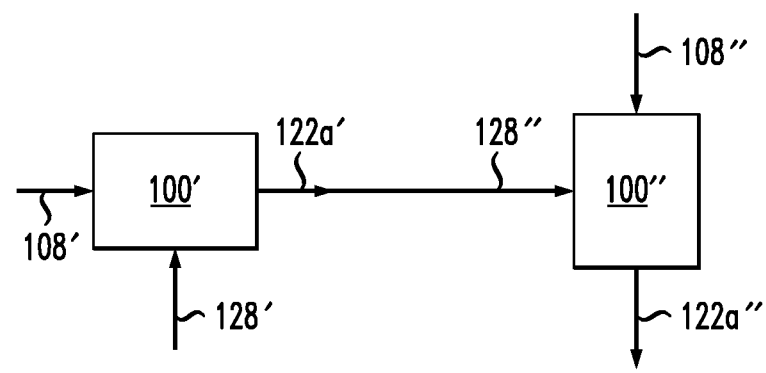
FIG. 2 shows a block diagram of a plasmonic device according to another embodiment of the invention.

FIG. 2 shows a block diagram of a plasmonic device 200 according to another embodiment of the invention. Device 200 has two cascaded instances of device 100. For clarity, the upstream and downstream instances of device 100 in device 200 and their corresponding signals are designated with "prime" and "double-prime" signs, respectively. Plasmonic output beam 122a' generated by device 100' is launched toward device 100". As plasmonic beam 122a' propagates between those devices, its intensity diminishes due to resistive losses in metal layer 104. When plasmonic beam 122a' reaches device 100", it is relatively weak and is used in that device as control signal 128". Device 100" then amplifies plasmonic control signal 128", e.g., as described above, and re-launches it as plasmonic output signal 122a", thereby advantageously increasing the effective propagation distance for plasmonic signal 122a'. If necessary, additional instances of device 100 can be appended downstream of device 100" to further increase the effective propagation distance for plasmonic signal 122a'.

Figure 3:
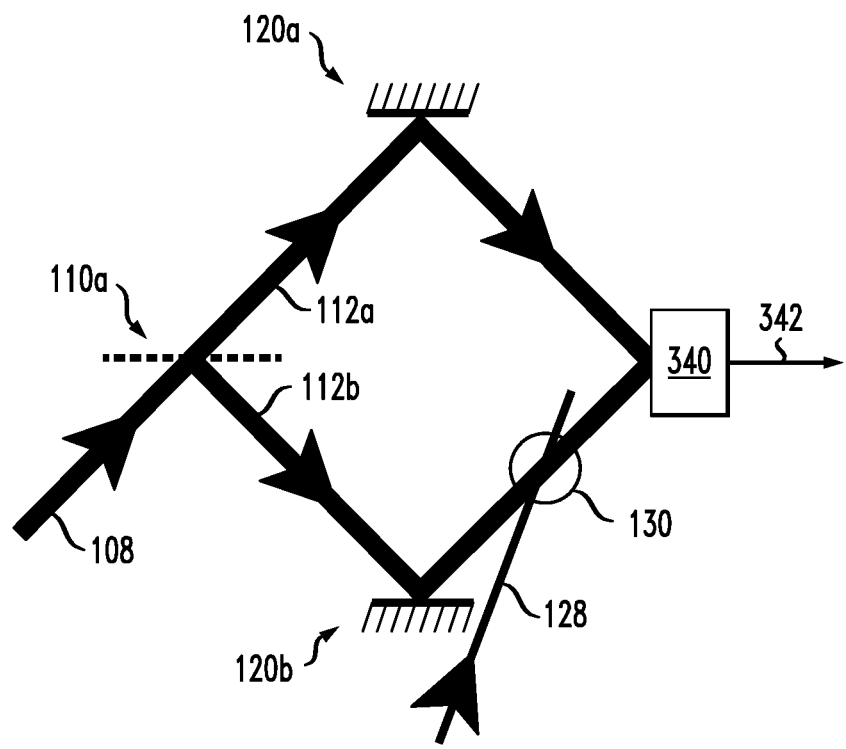
FIG. 3 shows a top view of a plasmonic device according to yet another embodiment of the invention.

FIG. 3 shows a top view of a plasmonic device 300 according to another embodiment of the invention. Device 300 is generally similar to device 100. However, instead of SP beam splitter 110b, device 300 has a plasmonic-beam mixer 340. SP mixer 340 is adapted to respond to an electromagnetic field by generating an output electrical signal 342 whose amplitude is proportional to the intensity of the electromagnetic field. In one embodiment, SP mixer 340 can be a photodiode. In other embodiments, other suitable photosensitive devices can similarly be used.

SP mixer 340 is positioned so that plasmonic beams 112a-b overlap thereon. The value of φ controls the interference of plasmonic beams 112a-b at mixer 340 and, as such, the amplitude of signal 342. If φ=0°, then plasmonic beams 112a-b interfere constructively, thereby producing a maximum amplitude for signal 342. In contrast, if φ=180°, then plasmonic beams 112a-b interfere destructively, thereby substantially nulling signal 342. Intermediate values of φ produce intermediate amplitudes for signal 342.

Advantageously, device 300 can be used to detect relatively weak plasmonic signals. As already explained above, relatively strong plasmonic input beam 108 can be used to amplify relatively weak modulated plasmonic signal 128. SP mixer 340 detects the amplified signal and converts it into relatively strong electrical signal 342, thereby enabling reliable detection of plasmonic signal 128.

While this invention has been described with reference to illustrative embodiments, this description is not intended to be construed in a limiting sense. Although devices of the invention have been described in reference to solid dielectric layers, the invention is not so limited. In one embodiment, a device of the invention can use gas, e.g., air, or a dielectric liquid, e.g., oil, as a dielectric layer or replace the dielectric layer with vacuum. While devices of the invention have been described as having a metal layer, other electrically conductive materials, e.g., heavily doped semiconductors that substantially function as conductors, can similarly be used. Device 300 can be implemented as an integrated circuit having both plasmonic and electronic circuit components fabricated on the same substrate. Although only two implementations (i.e., SP beam splitter 110b and photodiode 340) of a plasmonic-beam mixer have been described above, other implementations are also possible. Generally, any suitable device or structure that combines in some manner at least some portions of two plasmonic beams and possibly converts the resulting combination into a different (e.g., optical or electrical) type of signal can operate as a plasmonic-beam mixer in various embodiments of the invention. Although devices of the invention have been described as having a plasmonic-beam interaction region (e.g., region 130 in FIG. 1A) only in one arm of the devices, the invention is not so limited. In a different embodiment, a device of the invention can have one or more additional plasmonic-beam interaction regions, each receiving a corresponding plasmonic control signal. For example, each arm of the device might have at least one plasmonic-beam interaction region. Alternatively or in addition, one arm of the device might have two or more plasmonic-beam interaction regions. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art in which energy of the relevant type, e.g., optical energy or plasmonic energy, is allowed to be transferred between two or more elements, and the interposition of one or more additional elements is contemplated, although not required. Conversely, the terms "directly coupled," "directly connected," etc., imply the absence of such additional elements.

What is claimed is:

1. A method of processing plasmonic signals, comprising:
   splitting a surface plasmon (SP) input beam into first and second SP beams;
   directing the first SP beam along a first propagation path;
   directing the second SP beam along a second propagation path traversing a plasmonic-beam interaction region;
   applying a control signal of surface plasmons to said interaction region to change a phase of surface plasmons of the second SP beam in said interaction region; and
   mixing the SP beams from the first and second propagation paths in an SP beam mixer to produce a first SP output beam whose amplitude is responsive to said phase.

2. The invention of claim 1, wherein:
   said mixer is an SP beam splitter; and
   the step of mixing comprises mixing the SP beams from the first and second propagation paths in the SP beam splitter to produce (i) the first SP output beam and (ii) a second SP output beam whose amplitude is responsive to said phase.

3. The invention of claim 2, further comprising configuring said control signal to cause the SP beam splitter to substantially null an amplitude of a selected one of the first and second SP output beams.

4. The invention of claim 1, further comprising configuring said control signal to cause said mixer to modulate the amplitude of at least the first SP output beam.

5. The invention of claim 1, wherein the first SP output beam is an amplified version of said control signal.

6. The invention of claim 1, further comprising applying said first SP output signal to a second plasmonic-beam interaction region, wherein the second plasmonic-beam interaction region is adapted to change a phase of surface plasmons of a third SP beam propagating therethrough in a manner responsive to the first SP output beam.

7. The invention of claim 1, wherein:
   the step of directing the first SP beam along the first propagation path comprises reflecting the first SP beam toward said SP mixer using a first SP mirror; and
   the step of directing the second SP beam along the second propagation path comprises reflecting the second SP beam toward said SP mixer using a second SP mirror.

8. The invention of claim 1, further comprising changing the phase of surface plasmons of the second SP beam in said interaction region without changing a carrier frequency of surface plasmons.

* * * * *